United States Patent
Zhang et al.

(10) Patent No.: US 8,582,773 B2
(45) Date of Patent: Nov. 12, 2013

(54) KEY SYNCHRONIZATION MECHANISM FOR WIRELESS LAN (WLAN)

(75) Inventors: Junbiao Zhang, Bridgewater, NJ (US); Saurabh Mathur, Plainsboro, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 993 days.

(21) Appl. No.: 10/559,889

(22) PCT Filed: Jul. 27, 2004

(86) PCT No.: PCT/US2004/023940
§ 371 (c)(1),
(2), (4) Date: Dec. 7, 2005

(87) PCT Pub. No.: WO2005/015819
PCT Pub. Date: Feb. 17, 2005

(65) Prior Publication Data
US 2006/0133614 A1 Jun. 22, 2006

Related U.S. Application Data

(60) Provisional application No. 60/490,686, filed on Jul. 29, 2003.

(51) Int. Cl.
*H04L 29/06* (2006.01)
(52) U.S. Cl.
USPC ............................................... 380/273
(58) Field of Classification Search
USPC ............... 380/270, 273, 274, 277; 713/153
See application file for complete search history.

(56) References Cited

U.S. PATENT DOCUMENTS

| | | | | |
|---|---|---|---|---|
| 4,972,472 A * | 11/1990 | Brown et al. | ................ | 380/277 |
| 5,241,598 A * | 8/1993 | Raith | ............................ | 380/248 |
| 5,706,348 A * | 1/1998 | Gray et al. | .................... | 713/160 |
| 6,118,869 A * | 9/2000 | Kelem et al. | .................... | 380/44 |
| 6,377,692 B1 * | 4/2002 | Takahashi et al. | ............ | 380/277 |
| 6,526,506 B1 * | 2/2003 | Lewis | ........................... | 713/153 |
| 7,293,289 B1 * | 11/2007 | Loc et al. | ......................... | 726/23 |
| 7,400,733 B1 * | 7/2008 | Cam-Winget et al. | ........ | 380/283 |
| 2002/0164029 A1 | 11/2002 | Jiang | ............................ | 380/270 |
| 2003/0059052 A1 | 3/2003 | Cheng | ............................ | 380/274 |
| 2003/0131082 A1 | 7/2003 | Kachi | | |
| 2003/0219129 A1 * | 11/2003 | Whelan et al. | ................ | 380/270 |
| 2003/0221098 A1 * | 11/2003 | Chen et al. | .................... | 713/153 |
| 2004/0081320 A1 * | 4/2004 | Jordan et al. | .................. | 380/247 |
| 2005/0154896 A1 * | 7/2005 | Widman et al. | .............. | 713/182 |

FOREIGN PATENT DOCUMENTS

| | | |
|---|---|---|
| JP | 2002290396 | 10/2002 |
| JP | 2003204338 | 7/2003 |

* cited by examiner

*Primary Examiner* — Michael S McNally
(74) *Attorney, Agent, or Firm* — Robert D. Shedd; Robert B. Levy

(57) ABSTRACT

A key synchronization mechanism for wireless LANs is provided where the access point (AP) does not start using a new encryption key until the first data frame correctly encrypted with the new key is received from the station (STA). The new key is used from this point on, until the expiration of a key refresh interval.

18 Claims, 2 Drawing Sheets

KEY SYNCHRONIZATION MECHANISM FOR WIRELESS LAN (WLAN)

This application claims the benefit, under 35 U.S.C. §365 of International Application PCT/US2004/023940, filed 27 Jul. 2004, which was published in accordance with PCT Article 21(2) on 17 Feb. 2005 in English and which claims the benefit of U.S. provisional patent application No. 60/490,686, filed 29 Jul. 2003.

BACKGROUND OF THE INVENTION

1. Field of the Invention

The present invention relates to wireless networks. More particularly, it relates to a synchronization mechanism for a wireless local area network (LAN).

2. Description of the Prior Art

A key challenge to successful deployment of Wireless LANs (WLAN) is securing the wireless link. Due to its wireless nature, hacking into or gaining access and snooping into the data contained on any other computer on the wireless network is fairly trivial in a WLAN. Thus, data must be encrypted to prevent such unauthorized viewing. This encryption can be done either at the application layer or at the link layer level. The link level encryption is more useful as it does not require any modifications to existing applications. There are several mechanisms available to secure WLANs at the link layer:

Wired Equivalent Privacy (WEP)

Although WEP is by far the most widely used method, it has been shown to have several weaknesses. One main weakness being the absence of automatic periodic renewal of the encryption key. Thus, if someone captures enough WEP encrypted packets, it becomes relatively easy to deduce the encryption key.

WiFi Protected Access (WPA)

WPA is a relatively new standard that overcomes some short comings of WEP. It provides a mechanism for key rotation and hence is more secure.

Since WEP is the most widely deployed mechanism, solutions that enable key rotation in the WEP have been proposed. However, this leads to the problem of encryption key synchronization. The WLAN Access Point (AP) and the wireless station (STA) must share the same WEP encryption key. During initial encryption key setup and key rotation, it is possible that the AP and the STA get out of sync, i.e., the AP and STA update their encryption keys at slightly different times and hence have different encryption keys. During this out-of-sync period, the AP and the STA will not be able to communicate with each other. Worse yet, because they are out of sync, the signaling protocol exchange between them for encryption key setting may not be able to finish, creating a deadlock.

This problem not only occurs in the proposed key rotation in the WEP solutions, but may also occur with any type of mechanism in which the data packets (frames) used in the signaling protocol for key setting are encrypted. The present invention proposes a mechanism to solve the encryption key synchronization problem.

WPA does not suffer from the same problems as WEP key synchronization due to the fact that signaling protocol data is unencrypted. However, concerns have been raised regarding the unencrypted signaling data being explored by hackers. The proposed encryption key synchronization mechanism of the present invention can be used within the WPA framework with encrypted signaling data frames.

SUMMARY OF THE INVENTION

In accordance with an aspect of the invention, the encryption key synchronization method for wireless local area networks (WLAN) includes setting a current encryption key and an old encryption key at an access point in the WLAN and sending an encrypted data frame from a station in the WLAN to the access point using a first encryption key. Initially the old encryption key is set to an empty value (null). Decryption of the received data frame is performed by the access point using the current key (i.e., the current key at the AP is equal to the first key at the STA).

A new encryption key is generated at the access point upon expiration of a key refresh interval and sent to the station in an encrypted form using the first key. The access point resets the old key to be equal to the first key, and resets the current key to be equal to the newly generated key.

The access point receives a data frame and determines whether the encryption key being used by the station sending the data frame is the current key or the old key. This is determined by the access point by attempting to decrypt the data using the current key first. If that fails, the access point uses the old key to decrypt the data. If the key being used by the station is the old key and not the current key, the access point increments an out-of-sync counter indicating decryption failure since the station has not started using the newly generated key (i.e., current key).

When the access point determines that the data frame received from the station is using the new key, the access point starts using the new key and decrypts the data frame using the same. The access point then resets the old key to be equal to the current key, and resets the out-of-sync counter to zero showing that synchronization between the access point and station has been achieved using the new key.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar components throughout the views.

DETAILED DESCRIPTION OF PREFERRED EMBODIMENTS

The present invention is directed to a system/mechanism and method for encryption key synchronization for wireless LANs. Advantageously, the present invention allows for more secure encryption key synchronization in the key rotation used in WLAN data encryption. The key synchronization is performed at the link layer level. Accordingly, the present invention advantageously provides a more reliable encryption key synchronization mechanism that can be used at the link layer in WEP, WPA or other types of link layer mechanisms used to secure WLANs.

In accordance with an aspect of the invention, the access point (AP) maintains two encryption keys for each Station (STA). After a new key is set for the communication session between an AP and an STA, the AP does not start using the new key until the first data frame correctly encrypted with this new key is received from the STA. This new key will be used for the session between the AP and the STA from that point on. The AP also maintains an out-of-sync counter that is used to track the number of packets that could not be decrypted because of mismatched encryption keys.

It is to be understood that the present invention may be implemented in various forms of hardware, software, firmware, special purpose processors, or a combination thereof. Preferably, the present invention is implemented as a combination of hardware and software. Moreover the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Figure 1:
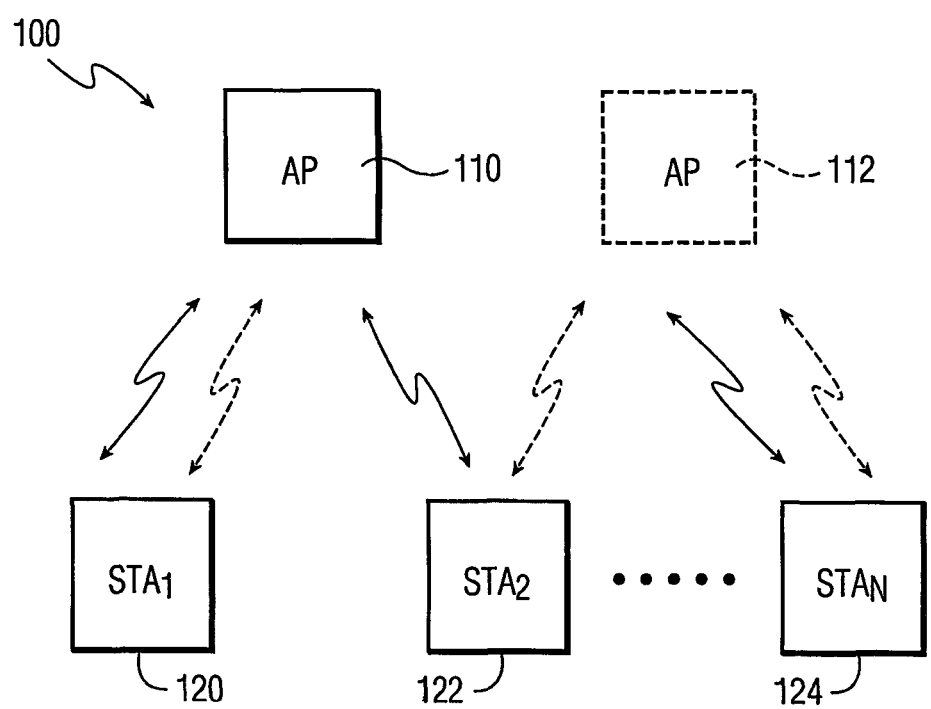
FIG. 1 is a block diagram of a WLAN according to an aspect of the invention.

Referring to FIG. 1, there is shown a WLAN 100 having a plurality of stations STA1, STA2, . . . STA$_N$, 120, 122, . . . 124, respectively, and at least one access point (AP) 110. In other contemplated systems, there may be additional access points AP 112.

Figure 2:
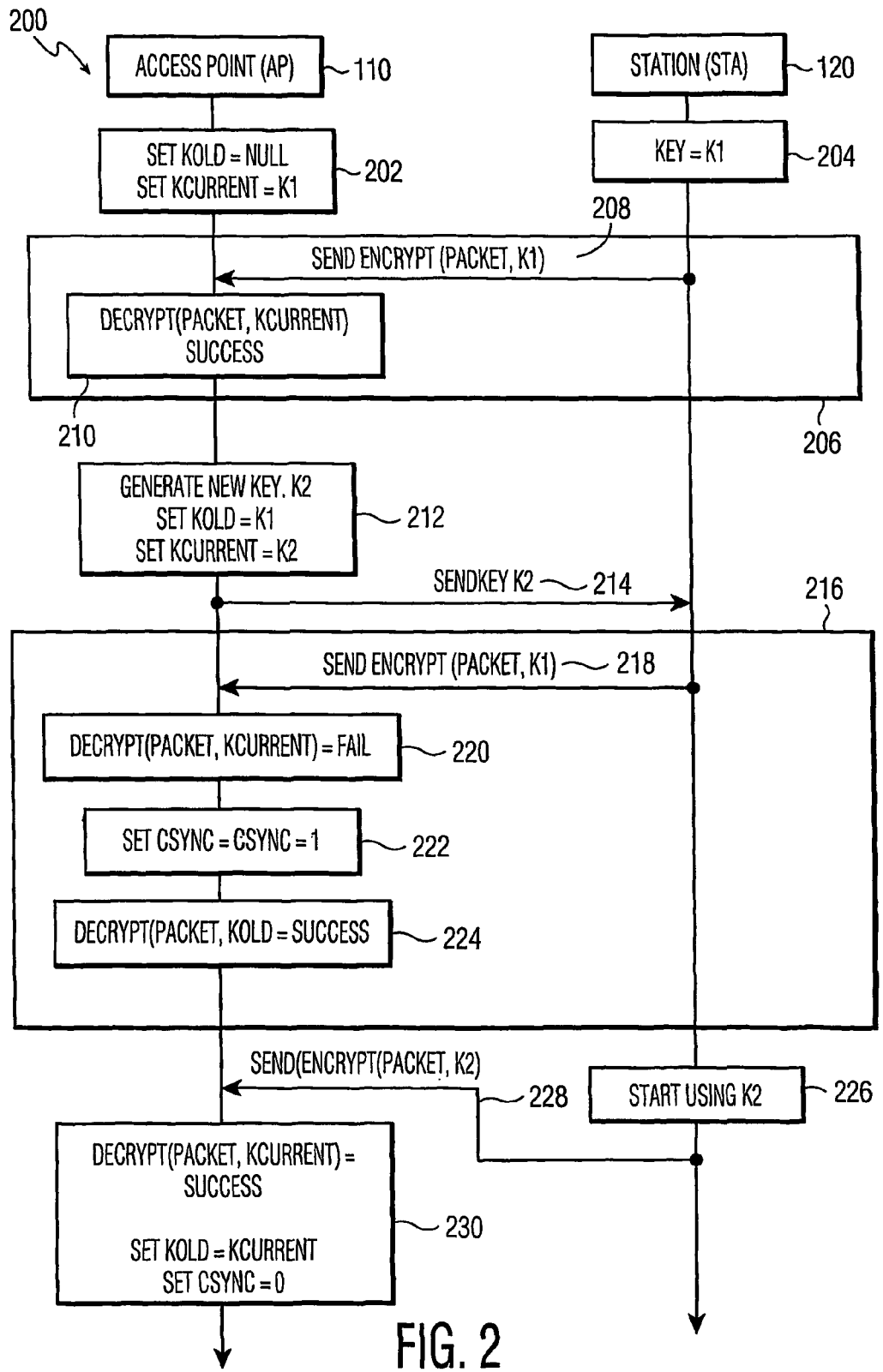
FIG. 2 is a processing diagram of the key synchronization mechanism according to an aspect of the invention.

FIG. 2 shows the key synchronization process 200 between an access point 110 and a station 120 according to an aspect of the invention. By way of example, two encrypt and decrypt processes 206 and 216 are shown. For purposes of this description, the term "station key" refers the encryption key being used by the station. As shown in the example of FIG. 2, the station key is initially K1 (204), and upon expiration of the key refresh interval, the station key will be K2. In addition, the terms "encryption key" and "key" are interchangeable throughout this description.

On key rotation, the AP 110 maintains and saves the last used key Kold and the new key Kcurrent (202). For exemplary purposes, it is assumed that both the AP and STA are initially in sync. In other words both share the same encryption key and are able to securely communicate with each other. As shown, K1 is set (204) at the STA, and Kcurrent=K1 (202) at the AP. The AP also initially sets Kold to a null value, as no new keys are generated until the expiration of the first key refresh time interval after startup. The STA sends an encrypted packet (208) using key K1, and the AP decrypts the packet (210) using the Kcurrent=K1 key with success.

At step 212, or the expiration of a key refresh interval (key rotation interval), the AP generates new key K2, sets Kold=K1 and Kcurrent=K2. The AP sends key K2 (214) to the STA after it is generated and while the previous link using key K1 is still in tact. Thus, key K2 is sent to the STA 120 in an encrypted state.

An out-of-sync condition arises when the AP has started using key K2 while the STA is still using key K1. In other words, all of the packets being sent from the STA (218) to the AP are encrypted with station key K1. The AP attempts to decrypt the packets with Kcurrent (i.e., key K2) and hence fails (220). The AP can make this determination by checking the CRC checksum at the end of each frame. Every time the AP fails to decrypt a packet, it increments an out-of-sync counter Csync by 1 (222). The out-of-sync counter Csync is used to track the number of packets that could not be decrypted because of mismatched encryption keys. Since the AP could not decrypt the packet with Kcurrent it re-tries to decrypt it with Kold (224). Since Kold is set to K1, the decryption is successful. Thus, the first indication to the AP 110 that a new key is being used by the STA 120 is determined when the first packet successfully encrypted using the new key that has been received and decrypted by the AP 110.

In a short time the STA also updates its key and starts using K2 (226) as its station key. The STA will then send (228) an encrypted packet using key K2. The AP is now able to decrypt the packets using Kcurrent (230). As soon as the AP receives the first correctly encrypted packet, it resets Csync=0, and sets Kold=Kcurrent (230). This process ensures that a malicious user who was able to deduce key K1 is unable to access the AP at the expiration of the key refresh period.

The out-of-sync counter Csync is maintained to ensure that the STA does not remain out-of-sync for long. Once Csync exceeds a pre-defined threshold, the STA is de-authenticated. This action will thwart a malicious user who may have been able to deduce key K1.

Those of skill in the art will recognize that in the above description, any of the keys could be null, which corresponds to no encryption. For example, at the initial key setting (202), there may not be any encryption, Kold is thus null. The above mechanism works the same way. This is because the AP not only can tell whether a frame is correctly encrypted with a particular key, it can also tell whether a frame is encrypted or not.

While there have been shown, described and pointed out fundamental novel features of the invention as applied to preferred embodiments thereof, it will be understood that various omissions, substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed, described or suggested form or embodiment as a general matter of design choice. It is the intention, therefore, to be limited only as indicated by the scope of the claims appended hereto.

The invention claimed is:

1. A key synchronization method for a wireless network comprising:

setting a current encryption key and an old encryption key at an access point in the wireless network;

generating a new encryption key at the access point;

resetting at the access point the current encryption key to equal the newly generated encryption key;

resetting at the access point the old encryption key to equal an encryption key being used by a station in communication with the access point;

communicating the newly generated encryption key from the access point directly to the station in an encrypted form using the old encryption key;

indicating at the access point a decryption failure for a data frame received from the station when the current encryption key fails to decrypt the data frame, and decrypting the data frame at the access point using the old encryption key; and resetting at the access point the old encryption key to equal the current encryption key when decryption using the new encryption key is successful.

2. The method according to claim 1, further comprising:

incrementing an out-of-sync counter in the access point when said decryption failure occurs due to the encryption key used by the station not matching the current encryption key; and decrypting received data frames associated with said out-of-sync counter at the access point using the old encryption key.

3. The method according to claim 2, wherein said out-of-sync counter comprises a predetermined threshold that if exceeded causes communication to terminate between the access point and a source of the data frames causing the threshold of said out-of-sync counter to be exceeded.

4. The method according to claim 1, further comprising:

decrypting, using the new encryption key, the received data frame from the station when the access point determines the station sending the received data frame is using the new encryption key, the access point starting to use the new encryption key when a first data frame correctly encrypted with the new encryption key is received from the station; and re-setting an out-of-sync counter to zero upon successful decryption.

5. The method according to claim 1, further comprising setting the old encryption key equal to a null value, said null value representing a no encryption mode.

6. The method according to claim 1, further comprising setting the current encryption key and the old encryption key to a null value, said null value representing a no encryption mode.

7. The method according to claim 1, wherein said setting is performed by the access point for each station in the wireless network.

8. The method according to claim 1, wherein the new encryption key is generated at the access point upon expiration of a key refresh interval.

9. A key synchronization system for a wireless network comprising:

at least one station in the wireless network; and at least one access point in the wireless network configured for: maintaining an old encryption key and a new encryption key through a key rotation interval for each of said at least one station, using said new encryption key for decryption when a first data frame correctly encrypted with said new encryption key is received from said at least one station and using said old encryption key for decryption when said new encryption key fails to decrypt a data frame received from said at least one station, and resetting the old encryption key to equal the new encryption key when decryption with the new encryption key is successful.

10. The key synchronization system according to claim 9, wherein said at least one access point is further configured for maintaining an out-of-sync counter to track a number of packets where decryption using said new encryption key fails.

11. The key synchronization system according to claim 9, wherein said at least one access point is configured for setting the old encryption key to a null value, said null value representing a no encryption mode.

12. The key synchronization system according to claim 9, wherein said at least one access point is configured for setting the new encryption key to a null value, said null value representing a no encryption mode.

13. The key synchronization system according to claim 9, wherein said at least one access point is configured for initially setting the old encryption key to a null value.

14. A key synchronization system for a wireless network comprising:

at least one station in the wireless network; and at least one access point in the wireless network configured for: maintaining an old encryption key and a new encryption key through a key rotation interval for each of said at least one station, setting said old encryption key equal to an encryption key used by said at least one station, and setting said new encryption key as a current encryption key; said at least one access point further configured for: using said new encryption key for decryption when a first data frame correctly encrypted with said new encryption key is received from said at least one station and using said old encryption key for decryption when said new encryption key fails to decrypt a data frame received from said at least one station, and resetting the old encryption key to equal the current encryption key when decryption with the new encryption key is successful.

15. The key synchronization system according to claim 14, wherein said at least one access point is further configured for maintaining an out-of-sync counter to track a number of packets where decryption using said new encryption key fails.

16. The key synchronization system according to claim 14, wherein said at least one access point is configured for setting the old encryption key to a null value, said null value representing a no encryption mode.

17. The key synchronization system according to claim 14, wherein said at least one access point is configured for setting the new encryption key to a null value, said null value representing a no encryption mode.

18. The key synchronization system according to claim 14, wherein said at least one access point is configured for initially setting the old encryption key to a null value.

* * * * *